(12) United States Patent
Ramos

(10) Patent No.: US 11,419,004 B2
(45) Date of Patent: Aug. 16, 2022

(54) OPTIMIZATION OF LOGICAL CHANNEL PROCESSING FOR MULTIPLE TRANSPORT BLOCKS

(71) Applicant: TELEFONAKTIEBOLAGET LM ERICSSON (PUBL), Stockholm (SE)

(72) Inventor: Edgar Ramos, Kirkkonummi (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 206 days.

(21) Appl. No.: 16/348,439

(22) PCT Filed: Nov. 8, 2017

(86) PCT No.: PCT/EP2017/078620
§ 371 (c)(1),
(2) Date: May 8, 2019

(87) PCT Pub. No.: WO2018/087154
PCT Pub. Date: May 17, 2018

(65) Prior Publication Data
US 2020/0084662 A1 Mar. 12, 2020

Related U.S. Application Data

(60) Provisional application No. 62/419,085, filed on Nov. 8, 2016.

(51) Int. Cl.
*H04L 29/06* (2006.01)
*H04W 28/02* (2009.01)
(Continued)

(52) U.S. Cl.
CPC ......... *H04W 28/06* (2013.01); *H04L 69/22* (2013.01); *H04W 28/0278* (2013.01); *H04W 72/1242* (2013.01)

(58) Field of Classification Search
CPC ..... H04L 69/22; H04L 69/321; H04L 69/322; H04W 28/0278; H04W 28/06; H04W 72/1242
See application file for complete search history.

(56) References Cited

U.S. PATENT DOCUMENTS 7,075,917 B2 * 7/2006 Herrmann ............. H04L 1/1819
370/349
7,145,895 B2 * 12/2006 Mueckenheim .. H04W 72/1242
370/348
(Continued)

FOREIGN PATENT DOCUMENTS

| CN | 101933358 A | 12/2010 |
|---|---|---|
| CN | 102474874 A | 5/2012 |

(Continued)

OTHER PUBLICATIONS

International Search Report and Written Opinion issued in International Application No. PCT/EP2017/078620, dated Mar. 23, 2018, 12 pages.
(Continued)

*Primary Examiner* — Alpus Hsu
(74) *Attorney, Agent, or Firm* — Christopher & Weisberg, P. A.

(57) ABSTRACT

A method for optimizing the processing of logical channels when multiple transport formats are to be served is provided. In certain aspects, instead of filling sequentially each transport format one by one, the protocol packets to be transmitted by the transport block are concurrently constructed. This may be accomplished, for instance, by taking into consideration the requirements of the data (for example, latency and reliability) to be transmitted as well as the characteristics of the available transport format (for example, size, expected channel quality, transmission length, etc.).

20 Claims, 14 Drawing Sheets

(51) Int. Cl.
*H04W 28/06* (2009.01)
*H04W 72/12* (2009.01)
*H04L 69/22* (2022.01)

(56) References Cited

U.S. PATENT DOCUMENTS

| | | | | | |
|---|---|---|---|---|---|
| 7,200,135 | B2* | 4/2007 | Choi | ............... | H04L 29/06 |
| | | | | | 370/282 |
| 7,272,117 | B2* | 9/2007 | Park | ............... | H04L 1/0009 |
| | | | | | 370/320 |
| 7,590,089 | B2* | 9/2009 | Park | ............... | H04W 28/065 |
| | | | | | 370/329 |
| 8,040,833 | B2* | 10/2011 | Choi | ............... | H04W 28/06 |
| | | | | | 370/335 |
| 8,050,292 | B2* | 11/2011 | Wu | ............... | H04W 28/065 |
| | | | | | 370/470 |
| 8,331,403 | B2* | 12/2012 | Torsner | ............... | H04L 1/0007 |
| | | | | | 370/474 |
| 8,401,036 | B2* | 3/2013 | Chandra | ............... | H04W 80/06 |
| | | | | | 370/469 |
| 8,493,909 | B2* | 7/2013 | Choi | ............... | H04W 72/1263 |
| | | | | | 370/335 |
| 8,630,270 | B2* | 1/2014 | Zhang | ............... | H04L 27/10 |
| | | | | | 370/337 |
| 8,670,369 | B2* | 3/2014 | Wang | ............... | H04B 7/155 |
| | | | | | 370/315 |
| 8,879,534 | B2* | 11/2014 | Marinier | ............... | H04W 28/06 |
| | | | | | 370/345 |
| 9,130,719 | B2* | 9/2015 | Kim | ............... | H04L 5/0053 |
| 9,247,550 | B2* | 1/2016 | Kim | ............... | H04W 72/08 |
| 9,338,690 | B2* | 5/2016 | Torsner | ............... | H04W 28/06 |
| 9,743,388 | B2* | 8/2017 | Choi | ............... | H04W 72/1263 |
| 2005/0094615 | A1* | 5/2005 | Kim | ............... | H04L 1/0003 |
| | | | | | 370/349 |
| 2010/0111206 | A1* | 5/2010 | Wu | ............... | H04L 1/0084 |
| | | | | | 375/260 |
| 2010/0232356 | A1* | 9/2010 | Maheshwari | ....... | H04W 12/037 |
| | | | | | 370/328 |
| 2012/0140704 | A1* | 6/2012 | Zhao | ............... | H04L 1/1835 |
| | | | | | 370/315 |
| 2014/0029564 | A1* | 1/2014 | Harada | ............... | H04W 72/10 |
| | | | | | 370/329 |
| 2015/0305012 | A1* | 10/2015 | Yi | ............... | H04L 5/0055 |
| | | | | | 370/329 |
| 2016/0037510 | A1* | 2/2016 | Park | ............... | H04W 76/16 |
| | | | | | 370/329 |
| 2016/0057808 | A9 | 2/2016 | Chandra et al. | | |
| 2018/0199314 | A1* | 7/2018 | Takeda | ............... | H04W 72/04 |
| 2019/0104551 | A1* | 4/2019 | Deenoo | ............... | H04W 76/28 |
| 2019/0116582 | A1* | 4/2019 | Pelletier | ............... | H04W 72/10 |
| 2019/0215727 | A1* | 7/2019 | Turtinen | ............... | H04W 28/065 |

FOREIGN PATENT DOCUMENTS

| | | |
|---|---|---|
| CN | 102752073 A | 10/2012 |
| CN | 102882640 A | 10/2012 |
| EP | 1 264 494 B1 | 10/2008 |
| EP | 2 037 655 A1 | 3/2009 |
| EP | 2 227 052 A1 | 9/2010 |
| EP | 2 635 083 B1 | 10/2015 |

OTHER PUBLICATIONS

Communication pursuant to Article 94(3) EPC dated Mar. 3, 2020 issued in European Patent Application No. 17804471.5 (2 pages).
Annex to Communication pursuant to Article 94(3) EPC dated Mar. 3, 2020 issued in European Patent Application No. 17804471.5 (4 pages).
Fahimeh Rezaei et al., "Analysis and Evaluation of Covert Channels over LTE Advanced", 2013 IEEE Wireless Communications and Networking Conference (WCNC): Networks, 2013 (pp. 1903-1908).
Fu Bo, WCDMA Femto MAC, "Study and Implementation of Function of MAC Layer in WCDMA Femto", South China University of Technology, Guangzhou, China, Dec. 10, 2011 (84 pages).
Ericsson, "Placement of RLC/MAC headers", 3GPP TSG-RAN WG2 #95bis, R2-166824, Kaohsiung, Taiwan, Oct. 10-14, 2016 (7 pages).

* cited by examiner

OPTIMIZATION OF LOGICAL CHANNEL PROCESSING FOR MULTIPLE TRANSPORT BLOCKS

CROSS REFERENCE TO RELATED APPLICATIONS

This application is a 35 U.S.C. § 371 National Stage of International Patent Application No. PCT/EP2017/078620, filed Nov. 8, 2017, designating the United States and claiming priority to U.S. Provisional Application No. 62/419,085, filed on Nov. 8, 2016. The above identified applications are incorporated by reference.

TECHNICAL FIELD

Disclosed are embodiments for data packet processing, such as, for example, data packet processing for data packets associated with a radio interface of a radio communications network.

BACKGROUND

The Third Generation Partnership Project (3GPP) has begun work on the development and design of the next generation mobile communications system (the 5G mobile communication system or simply "5G"). 5G will encompass an evolution of today's 4G networks and the addition of a new, globally standardized radio access technology known as "New Radio" (NR).

Communication systems typically divide data packets of a higher protocol layer (e.g. IP or, more generically, Layer 4 (L4)) into data packets suitable for transmission over the radio interface. Correspondingly, the receiving peer of the communication system reassembles the higher layer packets from the received data packets.

As illustrated in FIG. 1, such tasks are often performed by link layer protocols. Typically, the link layer protocols provide control information at the beginning (initial octets) of the packet, typically referred to as (packet) header. The control information may enable the receiving protocol peer entity to re-establish the original order in which the packets were sent, to request retransmissions of lost segments (ARQ), and/or to reassemble the payload (higher layer packets) of the higher protocol layer.

The placement of this control information in a header ensures that the receiver of the packet finds all control information to process and handles the packet as soon as the initial octets have been received. In particular, if this header comprises information about the length (total number of octets) of the packet, it is beneficial for the receiver to acquire this information as early as possible in the reception process.

The transmitter of a (link layer) communication protocol may compute/determine at least some of the control information only while or after generating the payload portion of the packet. Since the header is transmitted first, the sender of such protocol will not deliver any data (payload or control) octets to the receiving peer before the entire packet has been generated. Depending on the transmitter-side functions of the protocol (e.g. ARQ, segmentation, concatenation, padding), the processing time for creating a packet can become significant compared, for instance, to the actual transmission time of the packet.

In typical radio access networks, e.g. radio access networks according to 3GPP specifications, the link layer is split into protocol entities as illustrated in FIG. 2. The Packet Data Convergence Protocol (PDCP) is responsible for interfacing with the upper layer and executing operations for the data, which is in packet format. These operations include header compression/decompression, ciphering/deciphering, and buffering packet data. Additionally, the PDCP layer is responsible for the control plane, data integrity protection, in-sequence delivery as well as duplicate removal.

PDCP can interact, for instance, with the RLC layer. For example, as illustrated with respect to FIG. 2. Typically, the purpose of the RLC is to provide error-free transmission and adaptation of the packet domain to prepare the signal transmission domain. In the RLC is the responsibility of segmentation/concatenation, in-sequence delivery for PDCP, duplicate detection and retransmission handling. The RLC layer also provides radio bearer services to the PDCP layer. Radio bearers enable End-to-End Quality of Service (QoS) in the LTE network Link Layer. IP packets are mapped into radio bearers according to the Quality of Service (QoS) service properties. Each PDCP entity is mapped to a Radio Bearer and there is one RLC entity per radio bearer.

Typically, for instance, with respect to 3GPP access, the MAC layer is located below the RLC layer. A purpose of the MAC layer is to perform real time functions that require interaction with physical layer signaling or timing. Additionally, the MAC layer provides adaptations from the packet domain in order to prepare the signal transmission domain. The MAC layer provides error correction through Hybrid ARQ (HARQ) and priority handling with dynamic scheduling.

Additionally, MAC layer responsibilities can include multiplexing of logical channels and mapping the logical channels to transport channels. Often, each logical channel has its own RLC entity. Multiplexing may be done to enable logical channel prioritization and spectrum efficiency. Sometimes prioritization is needed to ensure that high priority traffic gets served before lower priority traffic. Multiplexing is executed in the transmitter side and demultiplexing is performed at the receiver side. The MAC layer provides services for the RLC by using logical channels. The MAC services allow the link layers to interface with the PHY layers.

Typically, Logical Channels can be either control channels, which are used for control signaling, or traffic channels, which are used for user data. In LTE, these logical channels are: The Broadcast Control Channel (BCCH), The Paging Control Channel (PCCH), The Common Control Channel (CCCH), The Dedicated Control Channel (DCCH), The Multicast Control Channel (MCCH), The Dedicated Traffic Channel (DTCH) and The Multicast Traffic Channel (MTCH). MAC layer is used to map these control channels to transport channels. In LTE, these transport channels are Uplink Shared Channel (UL-SCH), Multicast Channel (MCH), Downlink Shared Channel (DL-SCH), Paging Channel (PCH), Broadcast Channel (BCH) and Random-Access Channel (RACH). An illustration of uplink and downlink channels is provided in FIG. 3.

An SDU (Service Data Unit) is a data entity, which is received from the protocol layer above. A PDU (Protocol Data Unit) is a data entity, which is sent to protocol layer below after operations from the corresponding layer are performed. For example, the RLC protocol operates with the RLC SDU adding an RLC header, and provides the RLC PDU to the MAC layer. A MAC PDU typically contains a MAC header, one or more MAC SDUs, and optional padding. A MAC header and MAC SDU can vary in size. For instance, a MAC PDU header often contains one SL-SCH subheader and one or more MAC PDU subheaders.

As illustrated with respect to FIG. 4, a MAC layer may multiplex logical channels to transport channels and, in some instances, provide priority to each channel per the RLC entity. Often, each logical channel has its own RLC entity. The MAC layer can multiplex many logical channels into one transport channel. In this example, when this is done, the MAC headers are placed before the MAC SDU. A MAC SDU contains RLC headers, which again contains RLC PDUs. RLC SDUs contain the data received from the PDCP layer (PDCP PDU). At the receiver side, the MAC layer uses information from MAC headers for demultiplexing transport channels to the logical channel.

There are typically three modes for RLC header handling: Acknowledged mode (AM), Unacknowledged mode (UM) and Transparent mode (TM). Each of the modes can impact the construction of the MAC PDU. For example, in TM mode, a MAC PDU may consist only of a MAC Service Data Unit (MAC SDU). In UM and AM mode, RLC headers can be added.

SUMMARY

According to certain embodiments, Logical Channel Processing (LCP) considers the multiple transport formats from the beginning of the logical channel's PDU assignment to each of the MAC PDUs to be transmitted by the transport blocks. In some embodiments, instead of using a cascading and sequential filling of the frames (transport blocks), the logical channel processing may assign Logical Channel's PDUs to more than one MAC PDU simultaneously. In some embodiments, the assigning of the Logical Channel's PDUs could be done in a round robin fashion or optimized per a defined criterion, such as the size of the Logical Channel's PDUs and a transport block's expected reliability accounting for the expected quality of service of the Logical Channel's PDUs to be transmitted.

According to some embodiments, a method is provide for optimizing the processing of logical channels when multiple transport formats, which must be transmitted concurrently, are to be served. In certain aspects, instead of filling sequentially each transport format one by one, some embodiments enable the concurrent construction of the protocol packets to be transmitted by the transport block. This may be accomplished, for instance, by taking into consideration the requirements of the data (for example, latency and reliability) to be transmitted as well as the characteristics of the available transport format (for example, size, expected channel quality, transmission length, etc.). This can be achieved by interleaving the packets from the logical channel in between the transport block matching the requirements of the logical channel payload. In some embodiments, the interleaving is done using diverse methods, for example round-robin (e.g, sequentially assigning one to one), best-fit (e.g., optimizing to reduce overhead and need for segmentation), encoding friendly (e.g., selecting sizes that match physical layer encoding blocks), fast streaming (e.g., based in a time budget).

In certain aspects, the MAC layer, having several available transport blocks, receives data from the highest priority logical channel that has data to construct the corresponding MAC PDU of each transport block. Previously, the MAC layer required building a mapping of what transport formats can be used for such logical channels (called available transport format). The received data is then distributed with the indicated selected method. This indication could be explicitly provided by a network configuration or implicit to an implementation. According to some aspects, this process goes on until the logical channel data has been exhausted or all the available transport blocks capacity is depleted.

According to some embodiments, if there are still available transport blocks or transport blocks that were not suited for the currently processed logical channel transmission, and there is still data available in a subsequent priority logical channel, then the same process can be initiated for such logical channel until there is no more logical channels with data to process or all the transport channels capacity is depleted.

According to some embodiments, the MAC layer can store the metadata from the higher layers until all the bits to transmit (including padding) have already been sent to serialization, then the MAC layer sends the higher layer metadata to serialize and finishes the processing of the frame metadata, which is sent last for serialization. In certain aspects, metadata can be preprocessed before the transmission time, including header pre-construction of MAC PDUs or/and MAC SDUs. It may enable, for instance, the parallel construction and processing of multiple transport blocks from the ready to transmit (pre-processed) packets. For example, serializing and encoding the frames and directly transmitting them to the physical layer even if the previous process in the transmission chain have not yet concluded, and simultaneously applied for all or a subset of the transport blocks meant to be transmitted. According to some embodiments, parallel processing is provided by applying the disclosed features to a trailer based frame.

According to some embodiments, a method for transmitting data from a first device to a second device is provided. For instance, from a transmission point (TRP) to a User Equipment (UE), from a UE to a TRP, or from a UE to another UE. The method may include, for instance, assigning first data, such as a packet or set of packets, to a first transport block and second data to a second transport block. The method may further include transmitting the first and second data from the first device to the second device. In some aspects, the assigning of the second data to the second transport block can be performed before all assignments for the first transport block in a transmission time interval (TTI) have been completed.

According to some embodiments, a method performed by a communication device, such as a UE or TRP, is provided. The method can include, for instance, storing a first ordered set of protocol data units, PDUs. In certain aspects, the first ordered set of PDUs comprise a first PDU and a second PDU, where the second PDU immediately follows the first PDU in the first ordered set of PDUs. The first ordered set of PDUs may also have a first priority. According to some embodiments, the method also includes assigning the first PDU to a first transport block for transmission during a TTI and assigning the second PDU to a second transport block for transmission during the TTI. In certain aspects, the assignments can be made in parallel. In further embodiments, the method includes assigning at least a portion of a third PDU to the first transport block, where the third PDU is either: (i) included in the first ordered set of PDUs and follows the second PDU in the first ordered set of PDUs, or (ii) included in a second ordered set of PDUs, where the second ordered set of PDUs has a second priority that is lower than the first priority of the first ordered set of PDUs.

According to some embodiments, a User Equipment (UE) for communicating with another communication device, such as another UE or a transmission point (TRP), is provided. The UE may include, for instance, at least one processor and a memory. In certain aspects, the memory comprises instructions executable by the at least one processor, whereby the UE is configured to perform the methods described above and in the disclosed figures. The UE may also include a transmitter. In some embodiments, the UE is configured to transmit first and second data to another communication device by assigning the first data to a first transport block and assigning the second data to a second transport block, where the UE assigns the second data to the second transport block while the first transport block has remaining capacity for data.

According to some embodiments, a transmission point (TRP) for communicating with a user equipment (UE) is provided. The TRP may include, for instance, at least one processor and a memory. In certain aspects, the memory comprises instructions executable by the at least one processor, whereby the TRP is configured to perform the methods described above and in the disclosed figures. The TRP may also include a transmitter. In some embodiments, the TRP is configured to transmit first and second data to the UE by assigning the first data to a first transport block and assigning the second data to a second transport block, where the TRP assigns the second data to the second transport block while the first transport block has remaining capacity for data.

BRIEF DESCRIPTION OF THE DRAWINGS

The accompanying drawings, which are incorporated herein and form part of the specification, illustrate various embodiments.

DETAILED DESCRIPTION

Figure 1:
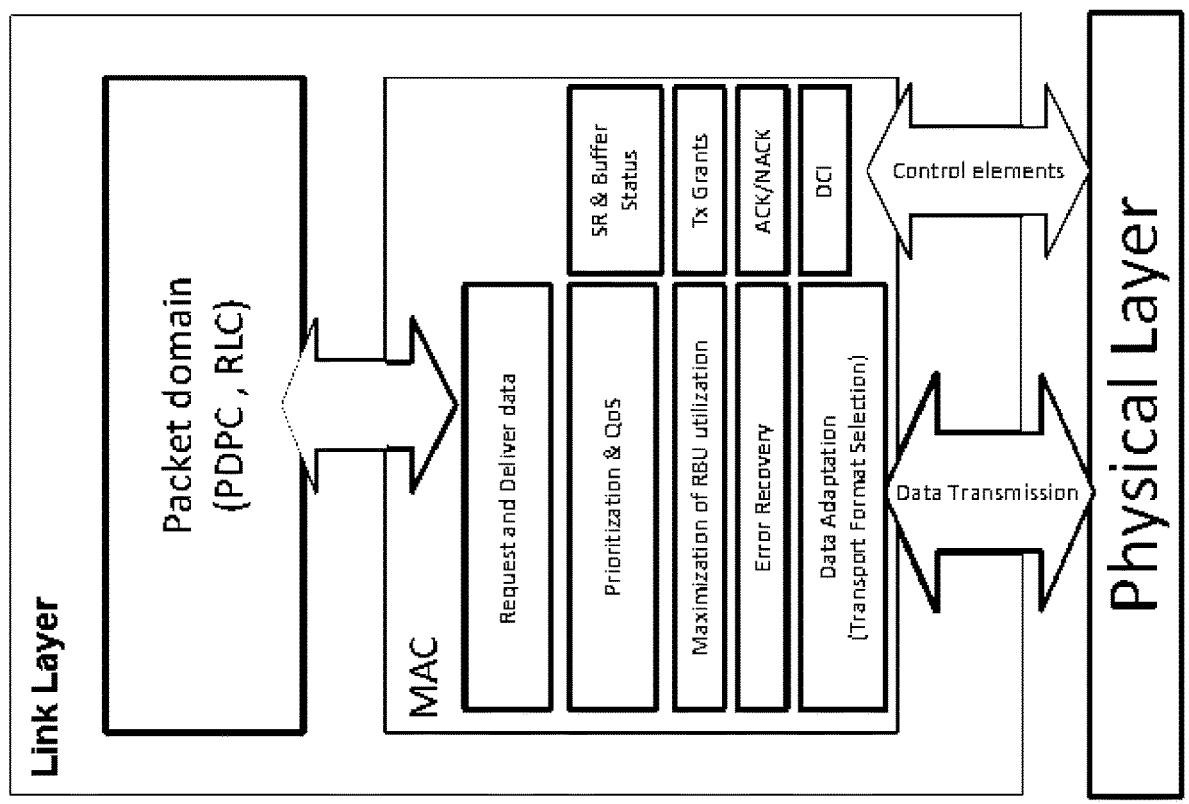
FIG. 1. illustrates a layer protocol setup.
Figure 2:
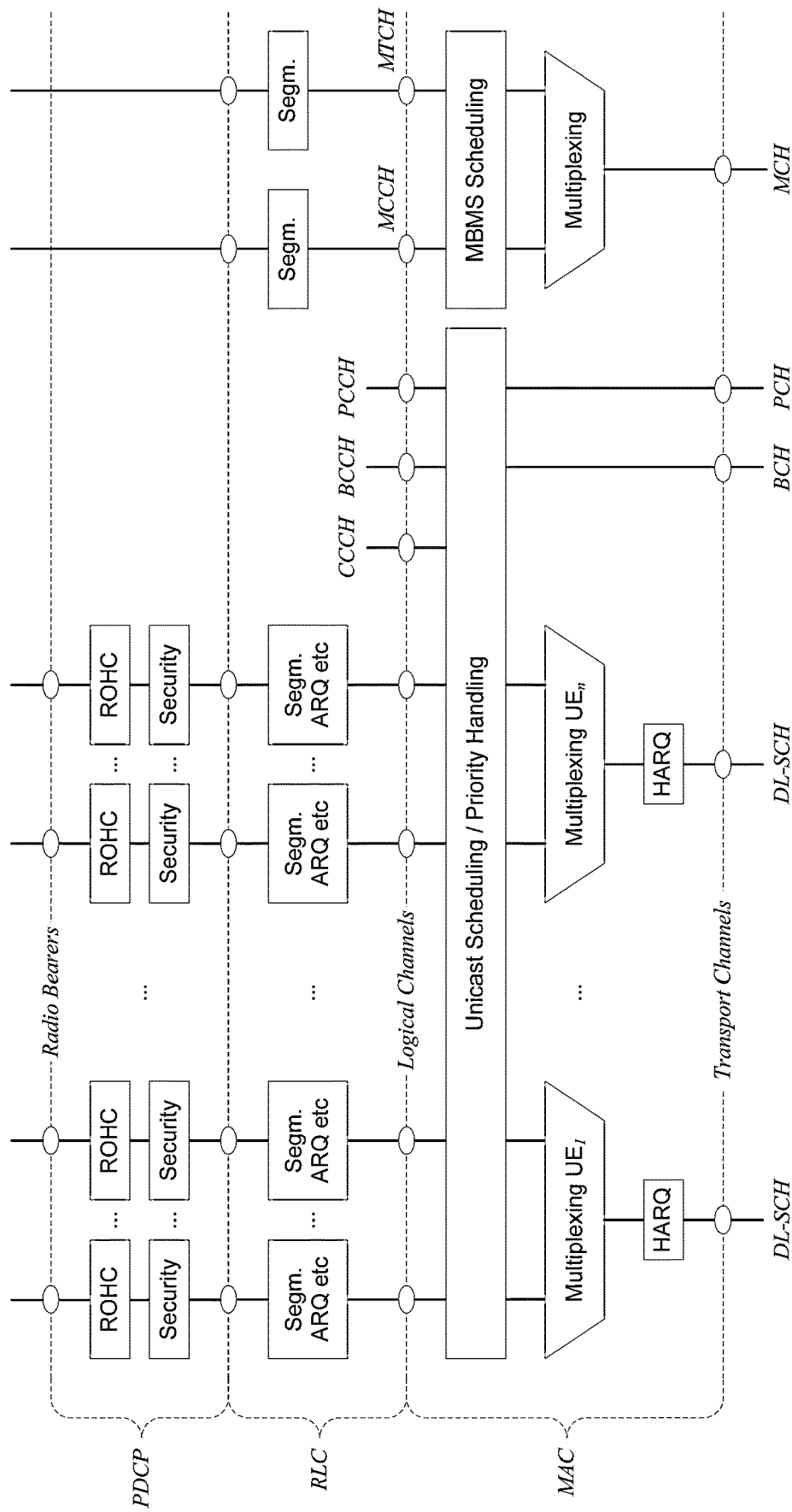
FIG. 2. illustrates a layer protocol setup.
Figure 3:
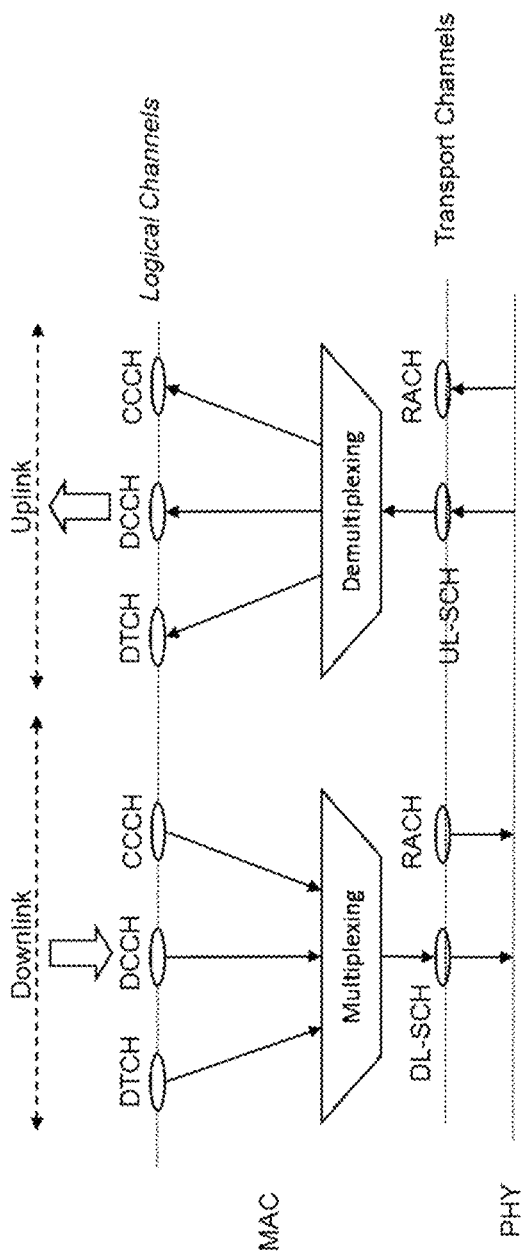
FIG. 3. illustrates a layer protocol setup.
Figure 4:
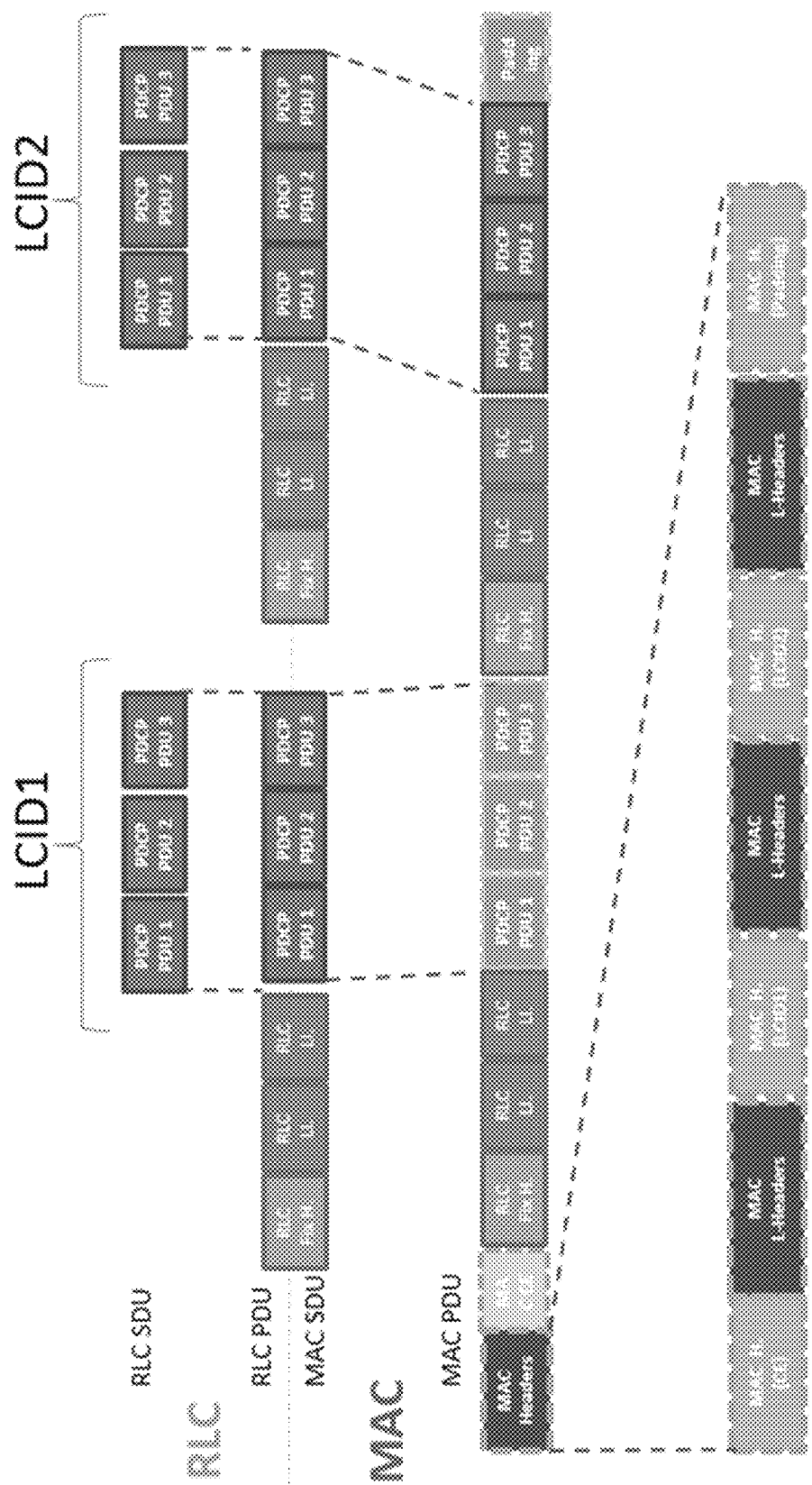
FIG. 4 illustrates layer blocks and information.
Figure 5:
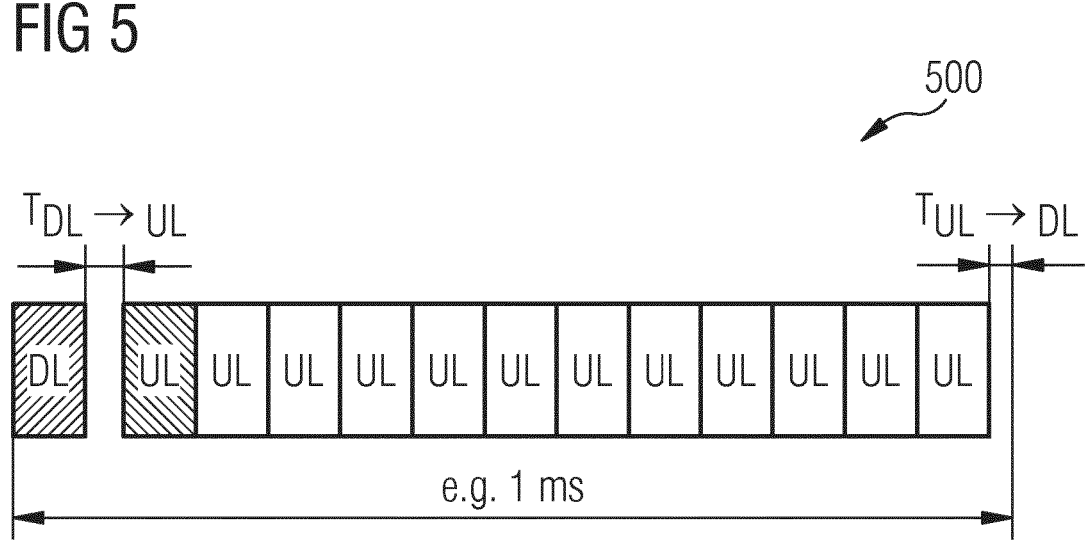
FIG. 5 illustrates uplink and downlink transmissions.

In 3GPP, the RAN1 intends to reduce the delay from the end of the reception of the DCI (UL grant) to the beginning of the transmission of the corresponding UL transport block to 1-2 OFDM symbol durations, as depicted in FIG. 5. FIG. 5 depicts a UL-Grant to UL-Data delay 500 in the order of 1-2 OFDM symbol durations.

In NR it is expected that the deployment of a massive number of antennas and the aggregation of bandwidth will enable operation at very high data rates. Consequently, MU-MIMO and Carrier Aggregation (CA) features will likely be key elements deployed in the NR networks. For MIMO and CA, multiple transport channels are used at the same transmission time, which the user plane (presently) must fill with MAC PDUs that are processed sequentially in a cascading (water-filling) fashion. This means that currently, for instance with respect to LTE Release 13, the first transport block should be filled with data from the LCP before starting with the next transport block.

Figure 6:
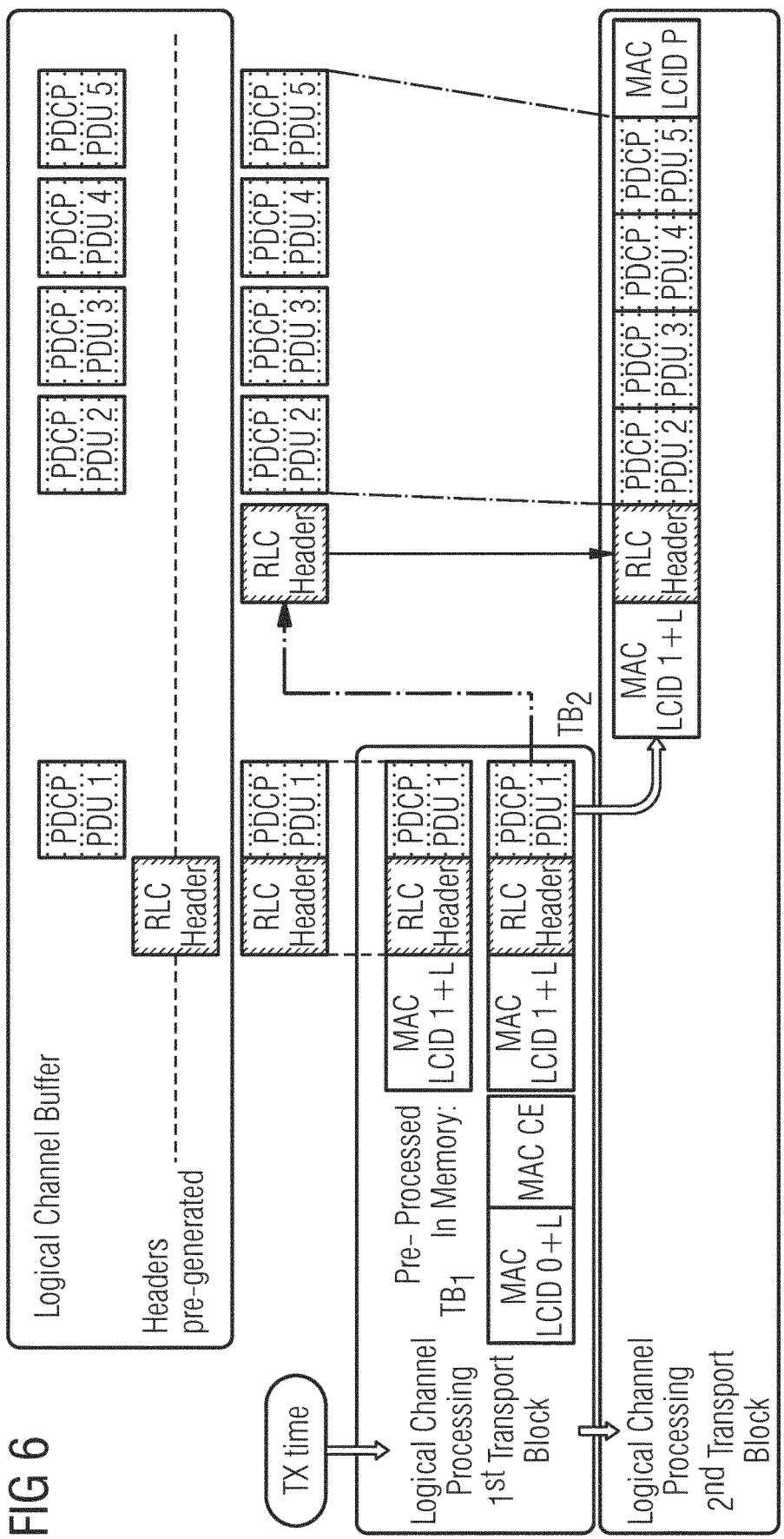
FIG. 6 is a diagram illustrating transport blocks and mapping for transmission.

However, even if it is possible to pre-generate some fields and accelerate the processing of the first transport block, it is not presently possible in LTE Release 13 to obtain additional processing gains from the pre-generation for the subsequent transport blocks, since the transmitter must wait for the LCP. This is for instance, due to the possibility of segmentation in each of the blocks and/or priority requirements. Thus, it is not possible to anticipate which logical channel must be transmitted in which transport block in-advance. FIG. 6 illustrates an example of two transport blocks for transmission and mapping of the processing timing of each of the parts. In the exmaple of FIG. 6, PDUs from the Logical Channel Buffer are allocated to the first and second transport blocks sequentially, such that MAC CE and PDU 1 are allocated to the first transport block and then PDUs 2-5 are allocated to the second transport block. In Carrier Aggregation or when multiple code words are used for transmission, the transport format(s) are served sequentially during LCP, requiring that the first transport block must be processed before the next, reducing the gains due to pre-processing.

According to certain embodiments, the Logical Channel Processing takes into account the multiple transport formats from the beginning of the logical channel PDU, assigning to each of the MAC PDUS to be transmitted by the transport blocks. Instead of using a cascading and sequential filling of the frames, for instance, as shown in FIG. 6, the logical channel processing may assign PDUs to more than one MAC PDUs simultaneously. The assigning of the PDUs could be done in a round robin fashion. According to some aspects, it is optimized according to a defined criterion, such as the size of the PDUs and a Transport Block's expected reliability in combination with the expected quality of service of the logical channel PDUs to be transmitted.

Figure 7:
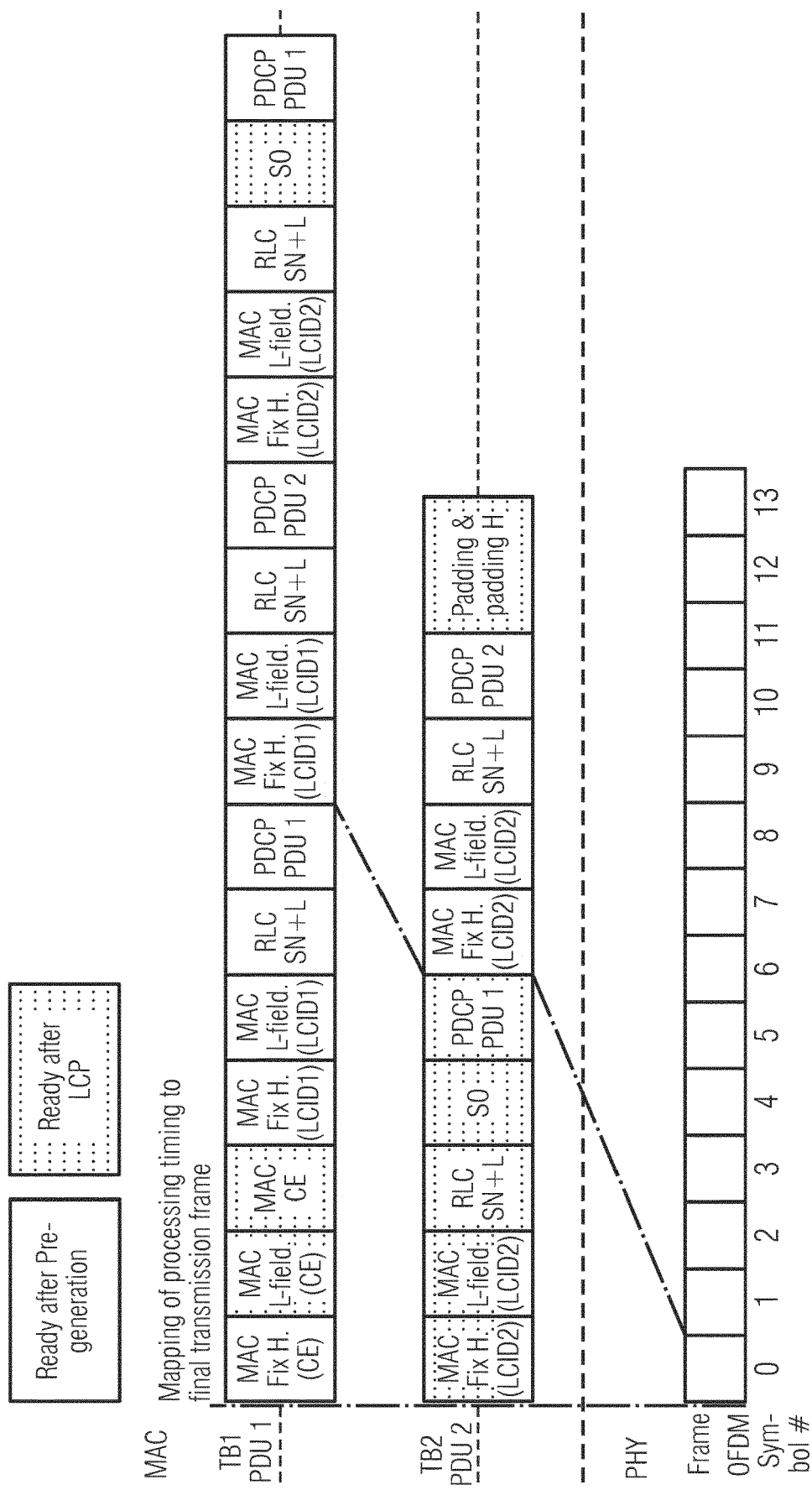
FIG. 7 is a diagram illustrating transport blocks and mapping for transmission.

This can be contrasted to the current handling of Logical Channels Processing (LCP), when there are present multiple transport blocks, the processing to provide payload to each of them is done sequentially, filling one transport block before starting to process the next one, as depicted in FIG. 7. In this example, the PDUs 1 and 2 of Logical Channel ID1 are allocated to TB 1, before PDU 1 of Logical Channel ID2 is allocated to TB1 and then segmented across to TB2. PDU 2 of Logical Channel ID2 is then allocated to TB2. Processing in this fashion can have a negative impact in the delay budget that a transmitting entity counts with respect to the start of the PHY layer transmission, since even when the transport blocks are processed sequentially, they begin to be transmitted simultaneously.

In some implementations, it is possible for a transmitter to send for physical (PHY) layer encoding blocks of data before the whole transmission frame has been serialized and fully constructed. However, presently, it is not possible for such implementations to benefit from the early encoding fully, because the sequential nature of the logical channel processing (as illustrated by FIGS. 6 and 7). Referring to FIG. 7, there is an example of a transmission of two transport blocks. The "dotted" fields can only be constructed after the first part of the logical channel processing has been executed.

According to some embodiments, by introducing awareness of the available transport blocks to the Logical Channel Processing, it is possible to construct the initial components of all or a subset of MAC PDUs without having to wait for the LCP to be finalized in the previous Transport Block. This enables the possibility of early PHY layer encoding and parallel processing of the transmissions of the involved transport blocks. This is done without modifications to the order of prioritization of each of the logical channels in the case of multiplexing and it can take into account the differences and properties of each of the transport blocks. For example, against the requirements of data mapped to the logical channels, such as latency or reliability.

Figure 8:
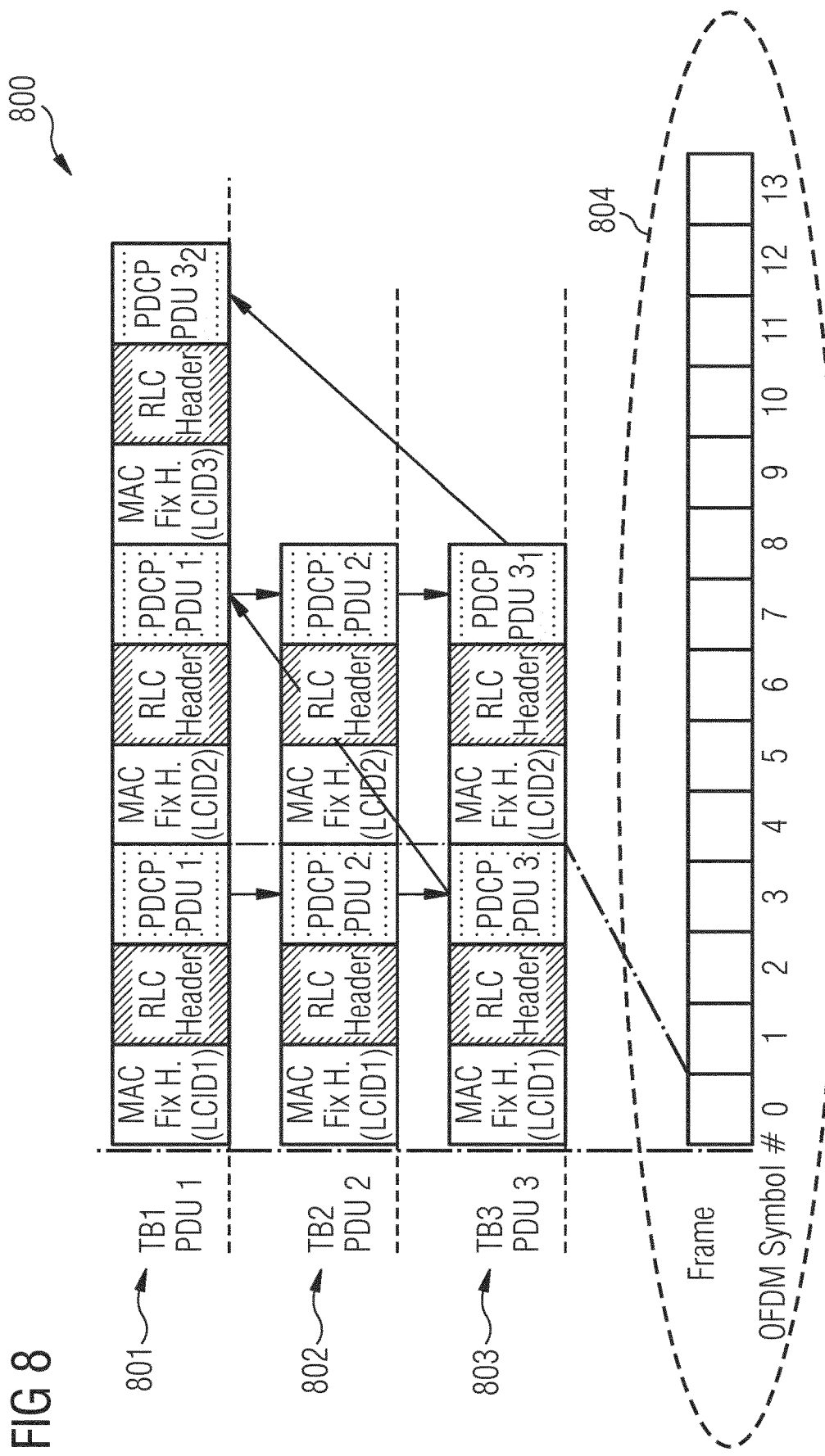
FIG. 8 is a diagram illustrating channel processing according to some embodiments.

Referring to FIG. 8, an example data allocation 800 according to some embodiments is provided. In the example of FIG. 8, the sequential assignment of payload during LCP for three transport blocks (801, 802, 803) is illustrated. As is shown in FIG. 8, the PDUs of Logical Channel ID1 are assigned to the available transport blocks (TB1, TB3, and TB3) such that PDU 1 is allocated to TB1, PDU 2 is allocated to TB2, and PDU 3 is allocated to TB3. In certain aspects, this allows these transport blocks to be encoded 804 and transmitted in the first OFDM symbol of the frame. As also shown in this example, and in accordance with some embodiments, the PDUs of Logical Channel ID2 are assigned to TB1-TB3 in a similar fashion, with PDU3 segmented between TB3 and TB1. In this respect, each of TB1-TB3 includes non-sequential PDUs.

Figure 9:
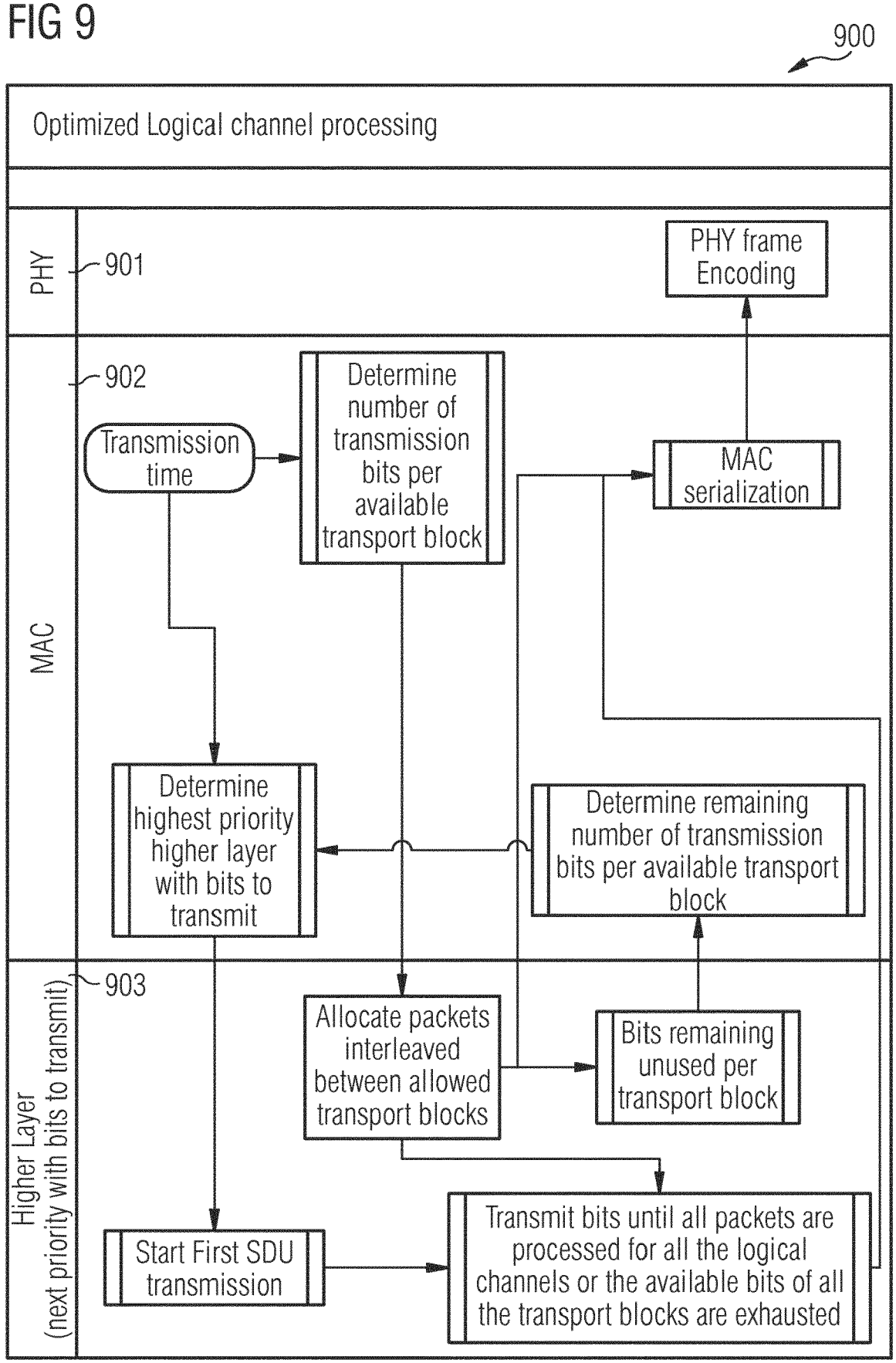
FIG. 9 is a diagram illustrating channel processing according to some embodiments.

Referring now to FIG. 9, a process 900 for optimized logical channel processing in accordance with certain embodiments is provided. The process may begin, for instance, with the start of processing according to a particular "transmission time." In the MAC layer 902, the processing, for instance at a transmission point (TRP) or User Equipment (UE) as illustrated with respect to FIGS. 14-16, includes both determining the number of transmission bits per available block and determining the highest priority layer with bits to transmit. With respect to determining the available bits, this could include, for instance, determining the number of available transport blocks, as well as the size. With respect to determining the highest priority layer with bits to transmit, this could include, for instance, determining the highest priority logical channel with data for which transmission is authorized. The process also includes the transmission of SDUs to the MAC layer 902 from higher layer 903 (e.g., RLC), allocating packets between the transport blocks, and transmitting bits until all packets are processed for all the logical channels or the available bits of all the transport blocks are exhausted. In some aspects, there is a determination at the MAC layer regarding the bits remaining unused per transport block and regarding the remaining number of transmission bits per available transport blocks. In some embodiments, MAC serialization and physical (PHY) frame encoding begins in parallel with the other processes in the physical layer 901.

Figure 10:
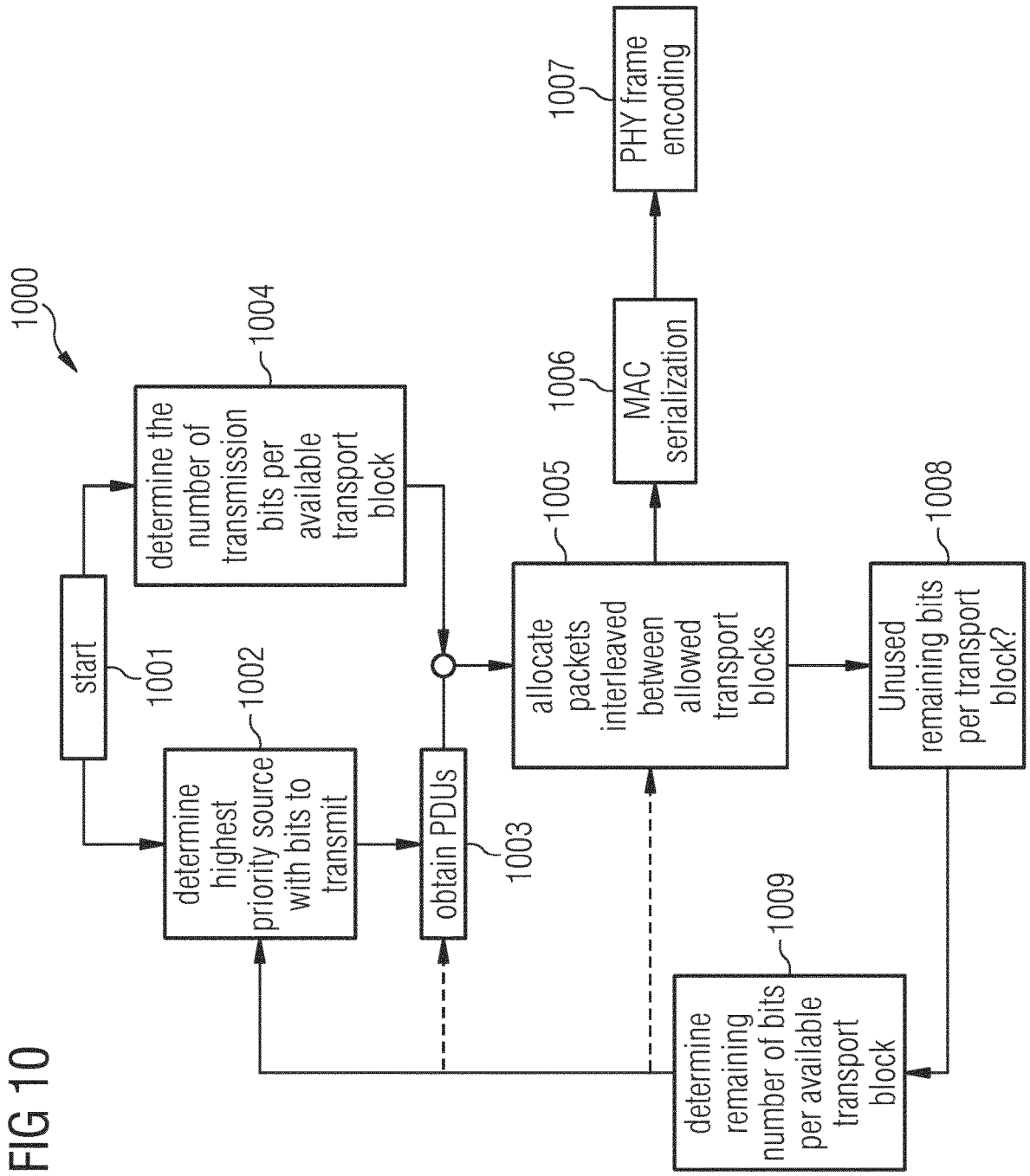
FIG. 10 is a diagram illustrating channel processing according to some embodiments.

Referring now to FIG. 10, a process 1000 for optimized logical channel processing in accordance with certain embodiments is provided. Process 1000 illustrates an embodiment of FIG. 9 in which an exemplary order of steps is shown. In this example, process 1000 starts at 1001, with function 1004 occurring in parallel with functions 1002 and 1003. That is, according to some embodiments, data is obtained 1003 and evaluated 1002 (e.g., with respect to priority) while a determination 1004 is made regarding the size, number, and availability of transport blocks. Process 1000 may then move to allocation function 1005, in which packets are interleaved between allowed transport blocks. The allocation 1005 may be performed, for example, in a round robin fashion or optimized per a defined criterion, such as the size of the PDUs and a transport block's expected reliability in combination with the expected quality of service of the logical channel PDUs to be transmitted. In some aspects, allocation may be according to an encoding friendly scheme or a fast streaming scheme. This may be based at least in part on, for instance, the determinations of functions 1002 and 1004. Once allocated 1005, the data may be serialized 1006 and encoded 1007. In certain aspects, serialization 1006 can occur in the MAC layer and/or encoding 1007 in the physical layer while subsequent allocations are made. In process 1000, a determination 1008 is made regarding available (e.g., unused yet authorized) space in one or more transport blocks, along with remaining number of bits 1009 per available transport block. The process 1000 may then repeat at function 1002. In some embodiments, the process may branch back to functions 1003 or 1005, instead.

Figure 11:
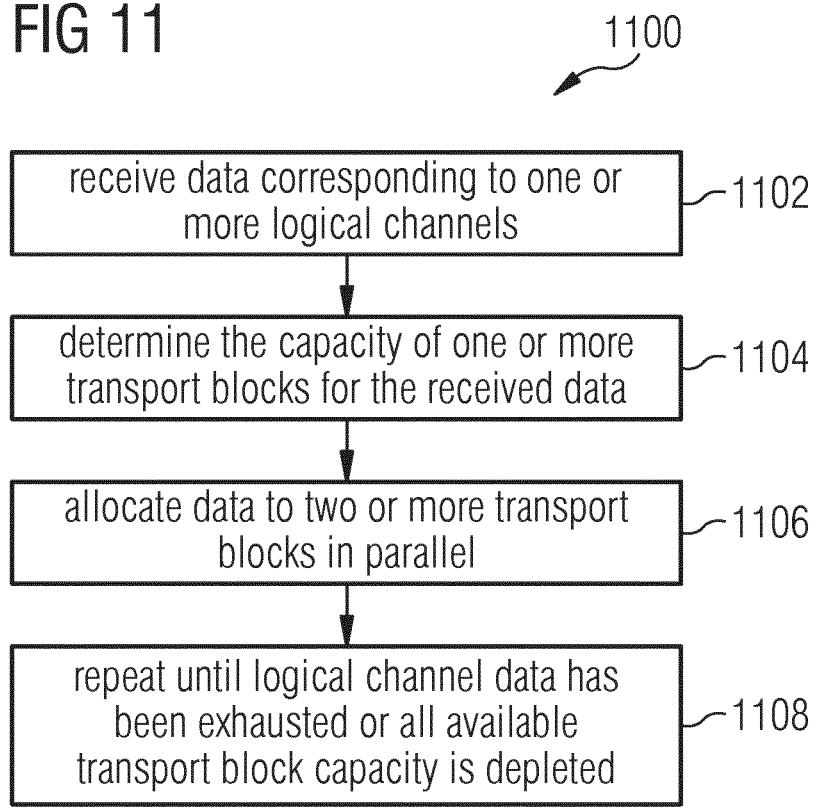
FIG. 11 is a flow chart illustrating a process according to some embodiments.

Referring now to FIG. 11 a process 1100 for the allocation of data to one or more transport blocks in accordance with certain embodiments is provided. The process may begin, for instance, in step 1102 in which data is received corresponding to one or more logical channels. The data may be, for instance, data units received in the MAC layer from a higher layer, such as the RLC. In some embodiments, the data may correspond to at least two logical channels having different priorities. The data may be, for instance, in the buffers of the logical channels. In step 1104, the data capacity of the one or more transport blocks can be determined. For instance, the number and size of the transport blocks may be evaluated in connection with the amount of data to be allocated. As such, in advance of the allocation, it is known whether data of a first logical channel may fit in a first transport block and/or in a first OFDM symbol of a frame. For example, and in accordance with certain embodiments, it can be determined that PDUs from a first logical channel can be allocated to first and second transport blocks without violating priority rules. Similarly, a first transport block may have PDUs from logical channels having different priorities without violating priority rules. In step 1106 the data is allocated in parallel between at least two transport blocks. In some respects, data is allocated to a second transport block while the first transport block still has capacity for data. That is, before the first transport block has been completely filled, finalized, or otherwise rendered unavailable to accept data. In some embodiments, steps 1102-1106 may be repeated (step 1108) until the logical channel data has been exhausted or all available transport block capacity have been depleted.

Figure 12:
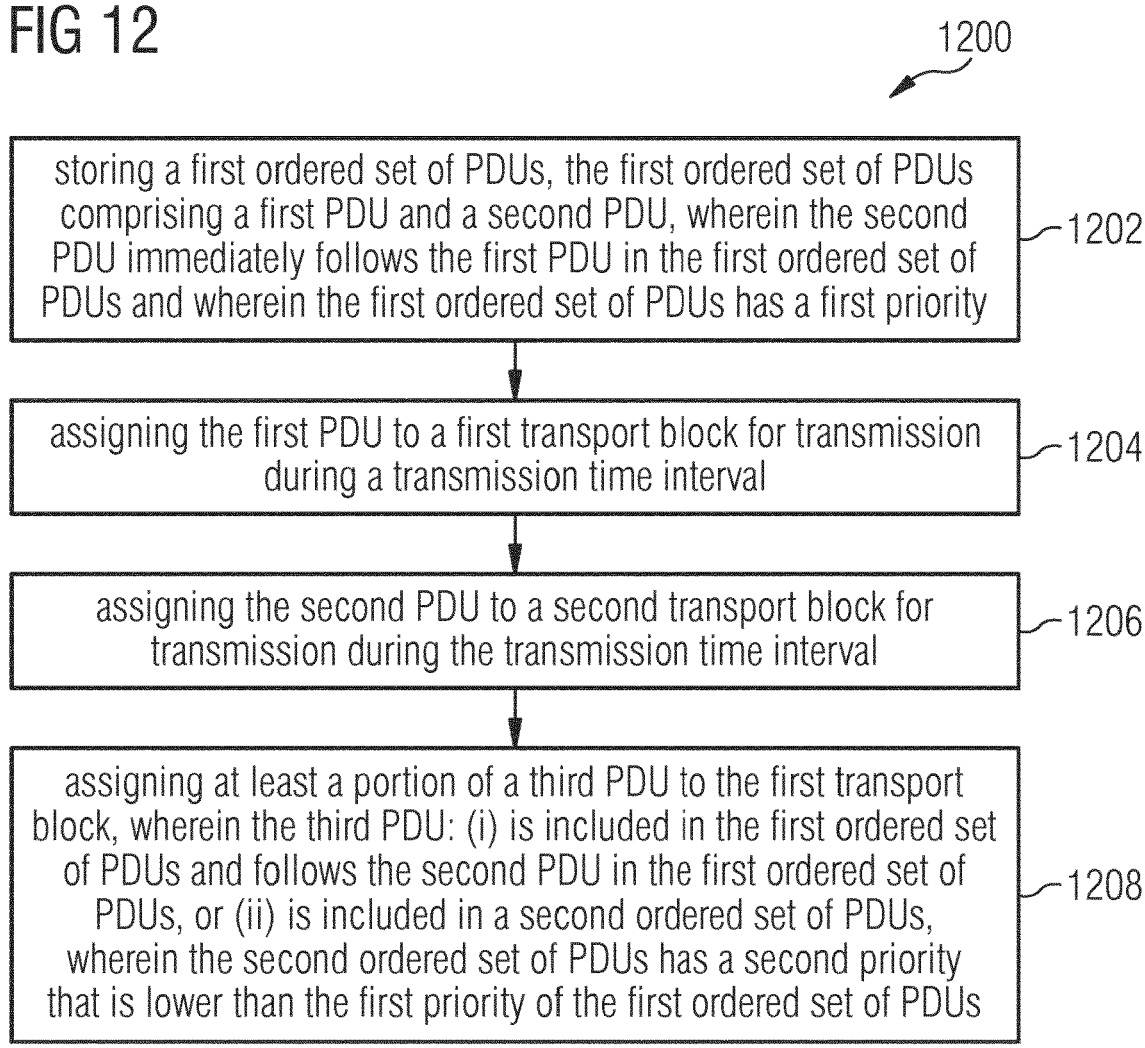
FIG. 12 is a flow chart illustrating a process according to some embodiments.
Figure 14:
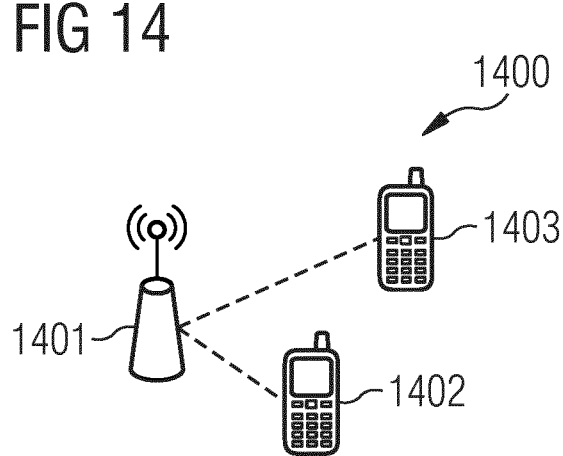
FIG. 14 is a diagram illustrating transmissions from a transmission point to one or more User Equipment (UE) devices according to some embodiments.
Figure 15:
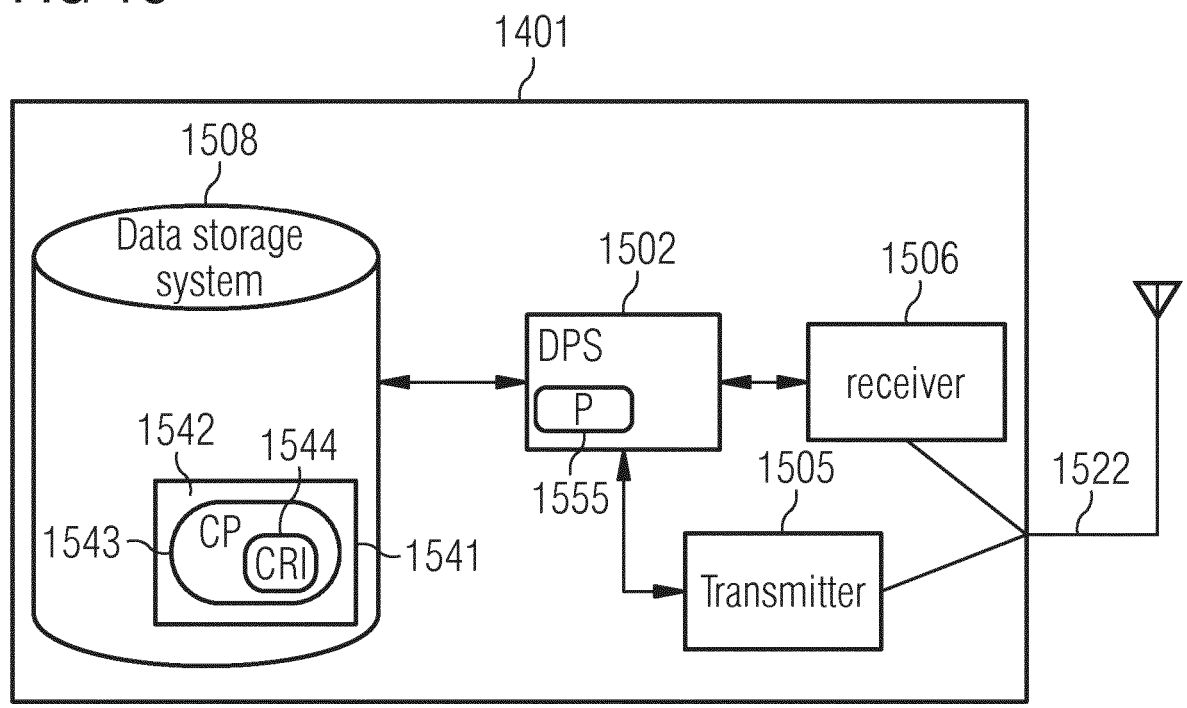
FIG. 15 is a block diagram of a transmission point (TRP) according to some embodiments.
Figure 16:
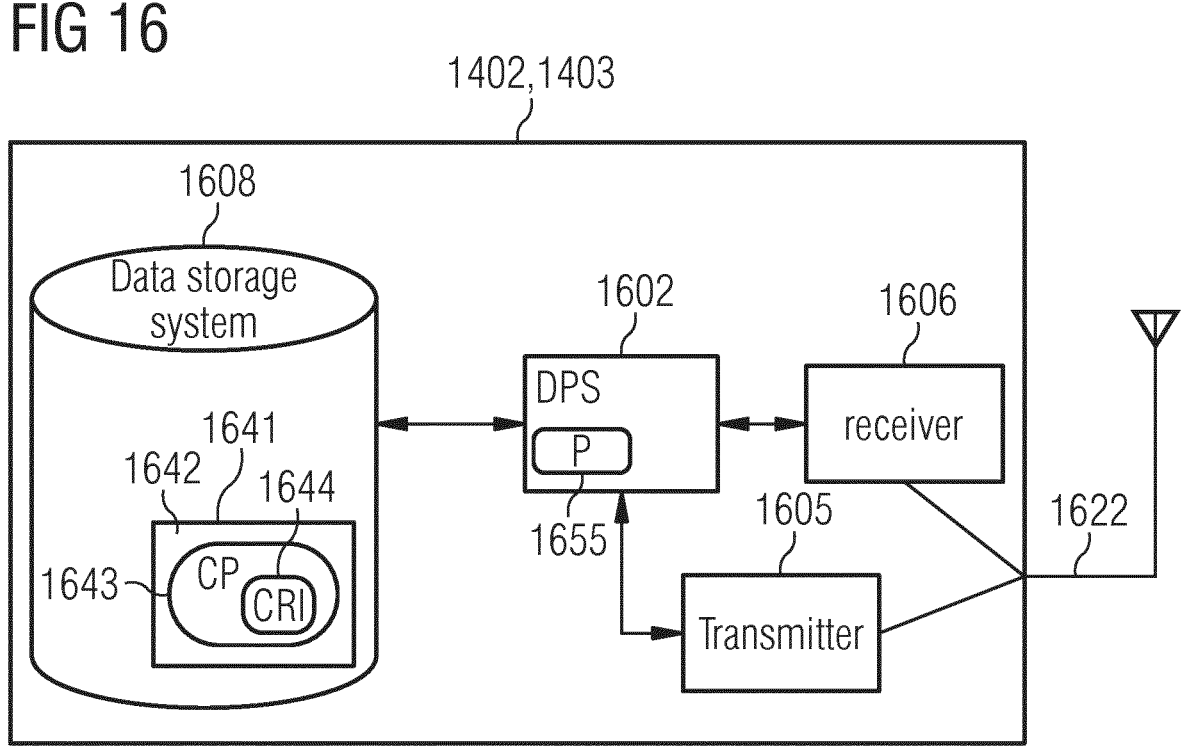
FIG. 16 is a block diagram of a User Equipment (UE) according to some embodiments.

Referring now to FIG. 12 a process 1200 performed by a transmission device in accordance with certain embodiments is shown. The process may begin, for instance, with step 1202, which can include storing a first ordered set of PDUs, the first ordered set of PDUs comprising a first PDU and a second PDU, where the second PDU immediately follows the first PDU in the first ordered set of PDUs and wherein the first ordered set of PDUs has a first priority. In step 1204, the transmission device assigns the first PDU to a first transport block for transmission during a transmission time interval. In step 1206, the transmission device assigns the second PDU to a second transport block for transmission during the transmission time interval. Process 1200 may further include step 1206, which can include assigning at least a portion of a third PDU to the first transport block. According to some embodiments, the third PDU: (i) is included in the first ordered set of PDUs and follows the second PDU in the first ordered set of PDUs, or (ii) is included in a second ordered set of PDUs, wherein the second ordered set of PDUs has a second priority that is lower than the first priority of the first ordered set of PDUs. In some embodiment, the transmission device is TRP 1401 or UE 1402, as illustrated in FIGS. 14-16. Additionally, in certain respects, the transmitter of TRP 1401 or UE 1402 can operate using a higher layer protocol (e.g., RLC) function and a lower layer protocol (e.g., MAC) function, where the lower layer comprises a plurality of available transport blocks. In some aspects, the steps of process 1200 may be performed in the lower layer.

Figure 13:
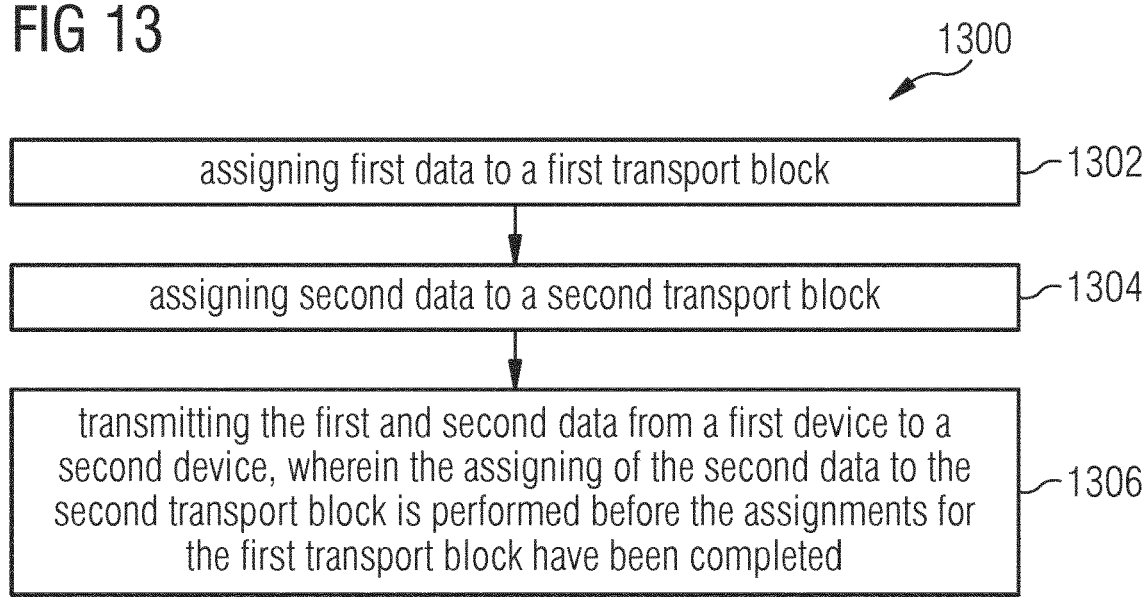
FIG. 13 is a flow chart illustrating a process according to some embodiments.

Referring now to FIG. 13, a process 1300 for data processing and transmission in accordance with some embodiments is shown. One or more steps of process 1300 may be performed, for instance, in a MAC layer of a communication device, such as TRP 1401 or UE 1402.

Process 1300 may begin, for instance, by assigning first data (step 1302) to a first transport block. In step 1304, second data is assigned to a second transport block. The data may be, for instance, a packet or set of packets. The data may be assigned, for instance, simultaneously. In some embodiments, the first data is from a first logical channel having a first priority and the second data is from a second logical channel having a second priority. The data may be, for instance, PDUs stored in a logical channel buffer. In some embodiment, the first priority is higher than the second priority. In other respects, the first and second data may be from the same logical channel.

According to some embodiments, the assigning of the second data to the second transport block is performed before the first transport block has been completely filled, finalized, or otherwise rendered unavailable to accept data. For instance, the second data can be assigned before assignments for the first transport block are completed. In some embodiments, at least one of the first and second assigning is based at least in part on one or more of a round-robin allocation scheme, an encoding friendly allocation scheme, and a fast streaming allocation scheme. In some embodiments, at least one of the first and second assigning is applied to prevent segmenting a PDU between the first and second transport block.

According to some embodiments, data is allocated in an encoding friendly allocation scheme that includes the placing of one or more logical channels' PDUS in a specific transport block according to the probability of decoding of the transport block. This could be, for example, affected by the size, level of encoding and frequency of transmission, as well as the quality of service requirements of the logical channels. For instance, a logical channel with high reliability requirement could be mapped to the transport blocks with the highest reliability as first criteria of selection.

According to some embodiments, a fast streaming allocation scheme can be applied. This could, for example, be used to address a low processing budget and optimize the selection process to serialize, encode, and send for physical layer transmission the frames as fast as possible. In certain aspects, allocation can run in parallel, where the serialization of packets might not have been completed for the whole frame when the encoding and actual transmission starts to happen. In some embodiments, the process is applied simultaneously to all or a subset of transport blocks meant to be transmitted in the Time Transmission Interval (TTI). Also, in some embodiments, the optimization option may arrange the logical channel PDUs in such a way that reduces the need for segmentation as well reducing the processing time and overhead. For example, processing could include placing complete PDUs in a transport block where they fit without segmentation, or placing them in the transport blocks where less segments are to be created. This could be, for instance, in total for the whole data of for one specific logical channel, according to the priority of the optimization algorithm.

In step 1306, the first and second data is transmitted from a first device to a second device. The first device may be, for example, a TRP while the second device is a UE. Similarly, the first device may be, for example, a UE while the second device is a TRP. In some embodiments, the first and second assigning are performed such that the first and second data are transmitted together in a single orthogonal frequency-division multiplexing (OFDM) symbol. In certain aspects, the process 1300 enables transmitting the first and second data without padding data in the OFDM symbol. The OFDM symbol may be, for instance, the first OFDM symbol of the frame.

According to some embodiments, process 1300 may also include determining one or more of the number of available transport blocks and the size of the first or second transport block. In certain aspects, at least one of the first and second assigning can be based on this determining. Also, process 1300 may include assigning third data to the first transport block, where the first, second, and third data are sequentially stored in a single logical channel buffer.

In some embodiments, process 1300 also includes providing encoding blocks based on said first and second data to a physical layer, where the providing is performed before a transmission frame having the first and second transport blocks is fully serialized or constructed.

According to some embodiment, processes 1100, 1200, and 1300 maybe be used in connection with one or more of a multiple-input multiple-output (MIMO) and/or carrier aggregation (CA) scheme. For instance, in a MIMO scheme, the first transport block could correspond to a first antenna of a transmission device and the second transport block to a second antenna of the device. As another example, in a CA scheme, the first transport block could correspond to a first channel and the second transport block to a second channel.

Referring now to FIG. 14, there is shown an arrangement 1400 with a transmission point (TRP) 1401 in communication with User Equipment (UEs) 1402, 1403. According to some embodiments, aspects of the present disclosure may relate to, for example, NR, 5G, the MAC layer and the RLC layer. The UEs may be, for example, a smartphone, laptop, tablet, phablet etc.; a machine-type communication device, such as a smart appliance, a sensor, etc.; or other device capable of wireless communication. The TRP may be, for example, a base station, access point, or other network node.

FIG. 15 is a block diagram of a TRP, such as TRP 1401, according to some embodiments. As shown in FIG. 15, the TRP may comprise: a data processing system (DPS) 1502, which may include one or more processors 1555 (e.g., a general purpose microprocessor and/or one or more other processors, such as an application specific integrated circuit (ASIC), field-programmable gate arrays (FPGAs), and the like); a radio transmitter 1505 and a radio receiver 1506 coupled to an antenna 1522 for use in wirelessly communicating with a UE; and local storage unit (a.k.a., "data storage system") 1508, which may include one or more non-volatile storage devices and/or one or more volatile storage devices (e.g., random access memory (RAM)). In embodiments where the TRP includes a general purpose microprocessor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, but not limited, to magnetic media (e.g., a hard disk), optical media (e.g., a DVD), memory devices (e.g., random access memory), and the like. In some embodiments, the CRI 1544 of computer program 1543 is configured such that when executed by data processing system 1502, the CRI causes the TRP to perform steps described above (e.g., steps described above with reference to the flow charts). In other embodiments, the TRP may be configured to perform steps described herein without the need for code. That is, for example, data processing system 1502 may consist merely of one or more ASICs. Hence, the features of the embodiments described herein may be implemented in hardware and/or software.

FIG. 16 is a block diagram of a UE, such as UE 1402 or 1403, according to some embodiments. As shown in FIG. 16, the UE may comprise: a data processing system (DPS) 1602, which may include one or more processors 1655 (e.g., a general purpose microprocessor and/or one or more other processors, such as an application specific integrated circuit (ASIC), field-programmable gate arrays (FPGAs), and the like); a radio transmitter 1605 and a radio receiver 1606 coupled to an antenna 1622 for use in wirelessly communicating with a TRP or other UE; and local storage unit (a.k.a., "data storage system") 1608, which may include one or more non-volatile storage devices and/or one or more volatile storage devices (e.g., random access memory (RAM)). In embodiments where the UE includes a general purpose microprocessor, a computer program product (CPP) 1641 may be provided. CPP 1641 includes a computer readable medium (CRM) 1642 storing a computer program (CP) 1643 comprising computer readable instructions (CRI) 1644. CRM 1642 may be a non-transitory computer readable medium, such as, but not limited, to magnetic media (e.g., a hard disk), optical media (e.g., a DVD), memory devices (e.g., random access memory), and the like. In some embodiments, the CRI 1644 of computer program 1643 is configured such that when executed by data processing system 1602, the CRI causes the UE to perform steps described above (e.g., steps described above with reference to the flow charts). In other embodiments, the UE may be configured to perform steps described herein without the need for code. That is, for example, data processing system 1602 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by medium access control, MAC, layer of a communication device for providing data to be transmitted to another communication device within a radio communications network, wherein the MAC layer receives first and second data from a higher layer with respect to the MAC layer, comprising:
   assigning the first data to a first transport block;
   assigning the second data to a second transport block;
   after assigning the first data to the first transport block and the second data to the second transport block, transmitting the first transport block and the second transport block to a lower layer with respect to the MAC layer;
   storing a first ordered set of protocol data units (PDUs) the first ordered set of PDUs comprising a first PDU and a second PDU, the second PDU immediately following the first PDU in the first ordered set of PDUs and the first ordered set of PDUs having a first priority;
   assigning at least a portion of a further PDU to the first transport block, the further PDU one of: i) being included in the first ordered set of PDUs and following the second PDU in the first ordered set of PDUs, and ii) being included in a second ordered set of PDUs, the second ordered set of PDUs having a second priority that is lower than the first priority of the first ordered set of PDUs;
   the assigning of the second data to the second transport block being performed before the assigning for the first transport block has been completed,
   assigning the first data to the first transport block comprises assigning at least a portion of the first PDU to the first transport block for transmission during a transmission time interval (TTI); and
   assigning the second data to the second transport block comprises assigning at least a portion of the second PDU to the second transport block for transmission during the TTI.

2. The method of claim 1, wherein each of the first and second data is included in one of:
   a fraction of a packed data unit PDU,
   a plurality of fractions of PDUs,
   one or a plurality of PDUs, or
   one or a plurality of fractions of PDUs and one or a plurality of PDUs.

3. The method of claim 2, wherein the first and second data are one or a plurality of protocol data units, PDUs or one or a plurality of fraction of PDUs received from one or more logical channels of a layer higher than the MAC layer, and wherein the higher layer with respect to the MAC layer is a radio link control, RLC, layer, and the lower layer with respect to the MAC layer is a physical, PHY, layer.

4. The method of claim 3, wherein the first data and the second data is received from a first logical channel having a first priority, and wherein further data is received from a second logical channel having a second priority, wherein the first priority is higher than the second priority, wherein the first and the second data is assigned first to the first and the second transport block, and wherein subsequently the further data assigned to the first and/or the second transport block if are still available transport blocks or parts of transport blocks that have not been used for the assigning of the data of first priority logical channel.

5. The method of claim 4, wherein the first and second assigning are performed simultaneously.

6. The method of claim 1, further comprising:
determining one or more of the number of available transport blocks and the size of the first and the second transport block,
wherein at least one of the first and second assigning is based on the determining.

7. The method of claim 1, wherein the assigning the plurality of data to the plurality of transport block is based at least in part on one or more of:
a round-robin scheme,
a best fit scheme to reduce overhead and/or segmentation,
an encoding friendly scheme selecting sizes that match physical layer encoding blocks, and
a fast streaming scheme based on a time budged.

8. The method of claim 1, wherein at least one of the first and second assigning is applied to prevent segmenting a protocol data unit, PDU, between the first and second transport block.

9. The method of claim 1, wherein the first and second assigning are performed such that the first and second data are transmitted together in a single orthogonal frequency-division multiplexing, OFDM, symbol, or
wherein the first and second data are transmitted without padding data in the OFDM symbol.

10. The method of claim 1, further comprising:
assigning third data to the first transport block,
wherein the first, second, and third data are stored in a single logical channel buffer in a sequential order.

11. The method of claim 1, wherein the communication device is one of: a transmission point, TRP and a user equipment, UE.

12. The method of claim 1, wherein the first transport block and the second transport block are transmitted at the same transmission time to the other communication device, wherein transmitting is performed by using a multiple-input multiple-output, MIMO, scheme, and wherein the first transport block corresponds to a first antenna of the first device and the second transport block corresponds to a second antenna of the first device.

13. The method of claim 1, wherein the transmitting includes transmitting the first and second data according to a carrier aggregation scheme, and wherein the first transport block corresponds to a first channel and the second transport block corresponds to a second channel.

14. The method of claim 1, further comprising:
providing encoding blocks based on said first and second data to a physical layer, wherein the providing is performed before a transmission frame having the first and second transport blocks is fully serialized or constructed.

15. The method of claim 1, further comprising:
assigning third data to a third transport block,
wherein the first data comprises a first portion of a first protocol data unit, PDU, the second data comprises a second portion of the first PDU, and the third data comprises both a second and third PDU.

16. The method of claim 1, wherein at least one of said first and second transport block contains non-sequential protocol data units, PDUs.

17. The method of claim 1, wherein the first and second data corresponds to a first ordered set of PDUs having a first priority, further comprising assigning at least a portion of a further PDU to the first or the second transport block, wherein the further PDU is included in a second ordered set of PDUs having a second priority that is lower than the first priority of the first ordered set of PDUs, and wherein the assigning of at least the portion of the further PDU is performed after the assigning of the first ordered set of PDUs has been completed.

18. The method of claim 1, wherein
the method further comprises assigning at least a portion of a third PDU to the first transport block.

19. A User Equipment (UE) for communicating with a communication device, comprising:
a transmitter, the UE being configured to use the transmitter to transmit first and second data to the communication device after assigning the first data to a first transport block and assigning the second data to a second transport block, the UE being configured to:
assign the second data to the second transport block while the first transport block has remaining capacity for data;
store a first ordered set of protocol data units (PDUs) the first ordered set of PDUs comprising a first PDU and a second PDU, the second PDU immediately following the first PDU in the first ordered set of PDUs and the first ordered set of PDUs having a first priority;
assign at least a portion of a further PDU to the first transport block, the further PDU one of: i) being included in the first ordered set of PDUs and following the second PDU in the first ordered set of PDUs, and ii) being included in a second ordered set of PDUs, the second ordered set of PDUs having a second priority that is lower than the first priority of the first ordered set of PDUs;
assigning the first data to the first transport block comprising assigning at least a portion of the first PDU to the first transport block for transmission during a transmission time interval (TTI); and
assigning the second data to the second transport block comprising assigning at least a portion of the second PDU to the second transport block for transmission during the TTI.

20. A transmission point (TRP) for communicating with a user equipment (UE) comprising:
a transmitter, the TRP being configured to use the transmitter to transmit first and second data to the UE after assigning the first data to a first transport block and assigning the second data to a second transport block, the TRP being configured to:
assign the second data to the second transport block while the first transport block has remaining capacity for data;
store a first ordered set of protocol data units (PDUs) the first ordered set of PDUs comprising a first PDU and a second PDU, the second PDU immediately following the first PDU in the first ordered set of PDUs and the first ordered set of PDUs having a first priority;
assign at least a portion of a further PDU to the first transport block, the further PDU one of: i) being included in the first ordered set of PDUs and following the second PDU in the first ordered set of PDUs, and ii) being included in a second ordered set of PDUs, the second ordered set of PDUs having a second priority that is lower than the first priority of the first ordered set of PDUs;
assigning the first data to the first transport block comprising assigning at least a portion of the first PDU to the first transport block for transmission during a transmission time interval (TTI); and assigning the second data to the second transport block comprising assigning at least a portion of the second PDU to the second transport block for transmission during the TTI.

\* \* \* \* \*